United States Patent [19]

Chou et al.

[11] Patent Number: 5,386,414
[45] Date of Patent: Jan. 31, 1995

[54] METHOD AND APPARATUS FOR DISTRIBUTING DATA TRAFFIC AMONG THE TRUNKS CONNECTING COMMUNICATION SWITCHES

[75] Inventors: Ching-Roung Chou, Naperville; Paul A. Rupsis, Winfield, both of Ill.; David H. Shur, Middletown, N.J.

[73] Assignee: AT&T Corp., Murray Hill, N.J.

[21] Appl. No.: 123,317

[22] Filed: Sep. 17, 1993

[51] Int. Cl.⁶ .............................................. H04L 12/56
[52] U.S. Cl. ........................................................ 370/60
[58] Field of Search ...................... 370/60, 60.1, 94.1, 370/94.2; 379/220, 221, 222, 224, 225

[56] References Cited

U.S. PATENT DOCUMENTS

| | | | |
|---|---|---|---|
| 4,831,649 | 5/1989 | Mejane | 379/220 |
| 5,099,475 | 3/1992 | Kozaki et al. | 370/60 |

*Primary Examiner*—Wellington Chin
*Attorney, Agent, or Firm*—Jack R. Penrod

[57] ABSTRACT

A method and apparatus that uses the number of in-service trunks in each trunk group connected to a communication switch as the number of indices that are contained in its respective trunk group distribution table. Each of the indices of each trunk group distribution table corresponds to a single trunk ID of a respective in-service trunk of the trunk group. The method provides for a uniform distribution of call assignments among the indices. Thus, with the uniform distribution of indices, the assignment of trunks to calls will also be uniformly distributed. With trunk traffic distributed among all the trunks of a trunk group, the overall efficiency of the trunk group will be very high. Further, if a trunk group has a loss or an addition of one or more of its trunks, the method and apparatus also provides for a dynamic reforming of its trunk group distribution table such that each of the indices of the reformed table corresponds to a single trunk ID of an in-service trunk, thereby maintaining the uniform distribution and high efficiencies even when there is a change in equipment.

7 Claims, 3 Drawing Sheets

METHOD 100

METHOD 100

METHOD AND APPARATUS FOR DISTRIBUTING DATA TRAFFIC AMONG THE TRUNKS CONNECTING COMMUNICATION SWITCHES

TECHNICAL FIELD

This invention relates to data communications, and more particularly to a method for distributing data traffic substantially equally among the trunks interconnecting communication switches, such as packet switches.

BACKGROUND OF THE INVENTION

Communication switch systems, such as 1PSS packet switch systems manufactured and used by AT&T, are typically interconnected either by a single trunk or a group of trunks known as a trunk group. Each trunk may provide hundreds of virtual circuit call connections at a time. For packet switch systems interconnected by a trunk group, a known distribution method has been used to distribute the packet traffic among the trunks of the group. Recently, a problem has been uncovered with this known distribution method during the operation of multiple 1PSS switch systems connected by trunk groups. The known distribution method works well for trunk groups having a power of two, e.g. 2, 4 and 8, as the number of trunks in the group. For trunk groups having a number that was not a power of two, e.g., 3, 5, 6, and 7, on the other hand, the known distribution method was unexpectedly found to be highly inefficient. For these latter trunk groups, as the number of trunks in the group increased the known distribution method was found to be increasingly ineffective.

Each 1PSS switch system is designed to have a maximum of eight trunks per trunk group interconnecting it to another 1PSS switch system. The known distribution method is based upon the maximum number of trunks. Trunks in a group are indexed according to their ID (between 0 and $M-1$), where M is the number of trunks in the group. The known method for routing traffic over the trunks of a group works as follows: In each switch, and for every trunk group there exists a trunk group table with 8 index entries. Starting at index position 0, the entries in the table are filled in with the trunk IDs of active trunks of the trunk group from 0 to $M-1$. If M is less than 8 but greater than or equal to 4, then starting at index position M, the filling-in process starts over again with trunk ID=0, and so on, until all 8 trunk ID entries in the table are filled in. If M is less than four, then the filling process starts over again at M, 2M and so forth. Table I below gives an example of the known method for M=2 and Table II gives an example of the known method for M=3,

TABLE I

| Trunk Group Size = 2 | | | | | | | | |
|---|---|---|---|---|---|---|---|---|
| Index | 0 | 1 | 2 | 3 | 4 | 5 | 6 | 7 |
| Trunk ID | 0 | 1 | 0 | 1 | 0 | 1 | 0 | 1 |

TABLE II

| Trunk Group Size = 3 | | | | | | | | |
|---|---|---|---|---|---|---|---|---|
| Index | 0 | 1 | 2 | 3 | 4 | 5 | 6 | 7 |
| Trunk ID | 0 | 1 | 2 | 0 | 1 | 2 | 0 | 1 |

During call processing, the packet switch associates a call-id with every virtual circuit set up for every call. The call-id modulo 32 is stored in a 5 bit field, referred to as the balance field, in an internal protocol packet header. Internal protocol is the protocol used for communication between the packet switches. Communication between a packet and any external devices, on the other hand, is by X.25 protocol. The 5-bit call-id is Subsequently divided modulo 8 and the remainder used as an index into the trunk group table in order to select a trunk of the trunk group.

Depending on the trunk group size, the traffic may or may not be evenly distributed across the group, as shown for trunk groups of sizes 2 and 3 above. For packet systems having large amounts of traffic, an uneven distribution in the trunk group table results in the trunk or trunks with the greater number of number entries in the trunk group table being filled to capacity, while the trunk or trunks with the lesser number of entries are less than full. This uneven distribution reduces the effective bandwidth and the packet carrying efficiency of the trunk group. This is shown in TABLE III, which presents the maximum trunk and trunk group efficiencies for the known trunk distribution method. In calculating these efficiencies, the number of calls distributed by each packet switch was assumed to be large, i.e. many simultaneous calls on each trunk.

TABLE III

| Number of Trks. per Group | No. of Full Trunks | No. of Partially Filled Trks. | Util. Of Partially Filled Trks. | Effective Bandwidth per Grp. | Average Group Effncy |
|---|---|---|---|---|---|
| 1 | 1 | 0 | — | 1 | 1 |
| 2 | 2 | 0 | — | 2 | 1 |
| 3 | 2 | 1 | 0.667 | 2.667 | .88 |
| 4 | 4 | 0 | — | 4 | 1 |
| 5 | 3 | 2 | 0.5 | 4 | 0.8 |
| 6 | 2 | 4 | 0.5 | 4 | 0.667 |
| 7 | 1 | 6 | 0.5 | 4 | 0.571 |
| 8 | 8 | 0 | — | 8 | 1 |

The average trunk group efficiency; the last column of TABLE III, is calculated as follows for a group of size M:

c is the average number of active calls on a trunk group over a given time interval T;

$c_i$ is the average number of active calls on trunk i in the trunk group over the same time interval T.

m=max $c_i$; and average trunk group efficiency=c/(mM).

For the purposes of the calculations shown in Table III, it was also assumed that call arrival, duration, and destination patterns were random, and that the interval T tends to infinity.

If the effective bandwidth of a group, i.e., (trunk group size)×(average trunk efficiency), is considered, the known distribution method yields an effective bandwidth of four trunks known per group for trunk group sizes 4, 5, 6, and 7. This means that using the known distribution method, trunk group call capacity does not increase until the number of trunks in a trunk group increases from 4 to 8. Furthermore, with the known trunk group distribution method if a trunk group with 8 trunks loses the operation of one of those trunks because of equipment problems, the overall trunk group capacity is reduced by one half with the loss of one eighth of its trunks.

The data of Table III show that trunk group inefficiencies occur where the number of trunks in a trunk group is not a factor, i.e., a sub-multiple, of the number of indices of the trunk group table.

Considering the anticipated growth of inter-switch traffic because of growth in consolidation of packet traffic, there is a need in the art for a distribution method that allows for growing trunk groups incrementally without suffering the inefficiencies of the known method. Similarly, since trunk group size reductions, either from equipment problems or local consolidations, are not unknown, there is also a need in the art for a trunk distribution method that allows incremental reductions of trunk group size, without incurring the substantial inefficiencies of the known method.

It is an object of the present invention to provide a distribution method that has a number of indices of a trunk group table that is a multiple of the number of trunks in a trunk group.

It is another object of the invention to provide an efficient apparatus for distributing calls among trunks of a trunk group between packet switch systems.

It is another object of the invention to provide a method for maintaining an even call distribution when one or more trunks are added to or deleted from an in service trunk group.

SUMMARY OF THE INVENTION

Briefly stated, the foregoing objects are achieved by providing a method that significantly improves the distribution of calls across a trunk group, and maintains an even call distribution if a trunk is added to or deleted from an in service trunk group. The method uses a trunk group table whose size is a function of the number of in-service trunks in its respective trunk group.

In one aspect of the invention, the foregoing objects are achieved by providing a method that uses a trunk group table whose size is a function of the number of active trunks in the trunk group connecting two packet switches and uses information stored in a plurality of data fields of an internal protocol header of the packet switches, which uniquely identifies each call, to select trunks from the trunk group table. These data fields are sorted by a distributing function and divided by the number of active trunks in the trunk group. The remainder of this division is used as an index of the trunk group table to select a trunk for the call.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
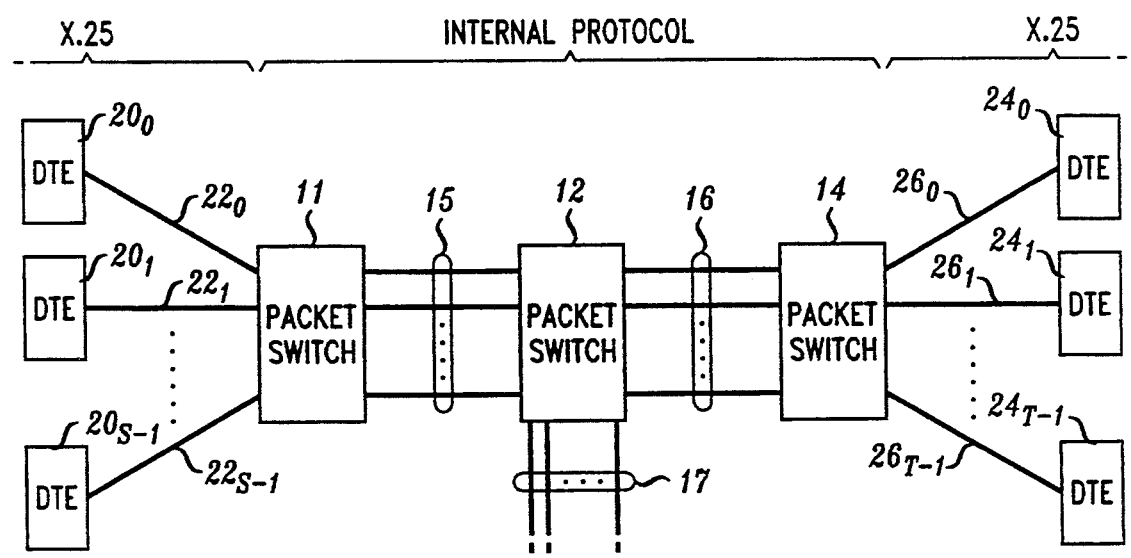
FIG. 1 is a block diagram of a multiple switch system inter-connected by trunk groups.

Referring now to FIG. 1, a packet system 10 is shown. Packet system 10 has a first packet switch 11 connected to a second packet switch 12 via trunk group 15. Second packet switch 12 is connected to a third packet switch 14 via trunk group 16. Each trunk of trunk groups 15 and 16 can form hundreds of virtual circuits between packet switch 12 and packet switches 11, 12 and 14.

Packet switch 11 has terminals $20_0-20_{S-1}$ connected thereto via trunks $20_0-22_{S-1}$ for transmitting and receiving packets. Similarly, packet switch 14 has terminals $24_0-24_{T-1}$ connected thereto via trunks $26_0-26_{T-1}$ for transmitting and receiving packets. Some of these packets will be communicated between switches 11 and 14 via switch 12 and trunk group 15 and 16 in order to complete calls between terminals $20_0-20_{S-1}$ and terminals $24_0-24_{T-1}$.

The method of the present invention provides a more even and more efficient distribution of the packet traffic communicated over trunk groups 15 and 16. This description describes the operation of the method in distributing traffic from terminals $20_0-20_{S-1}$ directed to terminals $24_0-24_{T-1}$ among the trunks of trunk groups 15 and 16. The method also applies equally as well for packet traffic going in the other direction, but for brevity, only the traffic traveling from terminals $20_0-20_{S-1}$ to terminals $24_0-24_{T-1}$ will be described.

Figure 2:
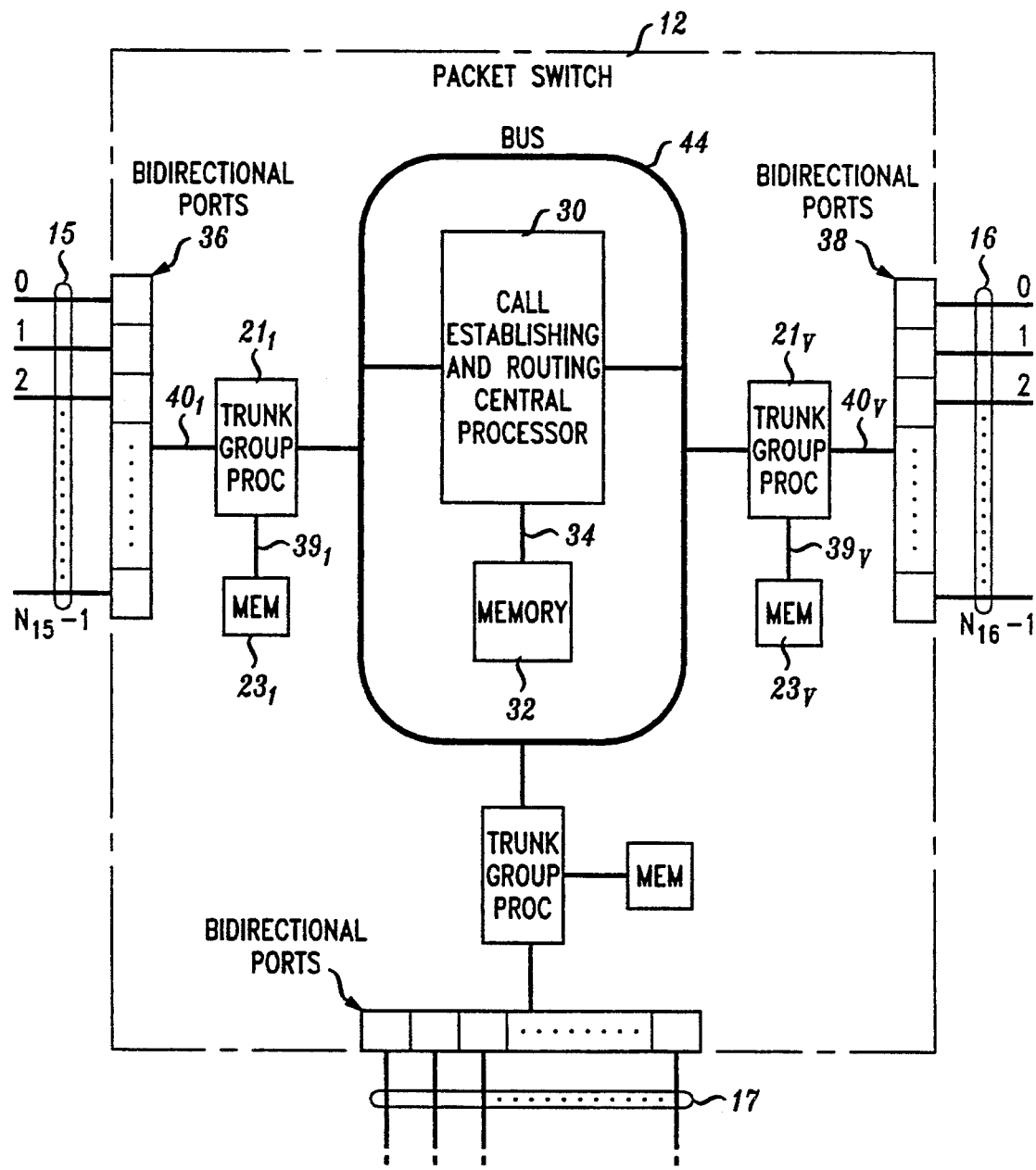
FIG. 2 is a block diagram of one of the switches of the system shown in FIG. 1.

Referring now to FIG. 2, details of the packet switch 12, which is essentially identical to packet switches 11 and 14, will be described. Packet switch 12 has a central call establishing and routing processor 30 that processes programs and data to provide its overall operation. Packet switch 12 also has a memory 32, which stores many of the programs processed by the processor 30, as well as data that the processor 30 needs to properly operate. One of the programs stored in memory 32 is a revised trunk distribution method according to the invention. Processor 30 is connected to memory 32 via bus 34. Packet switch 12 also has peripheral trunk processors $21_0-21_{V-1}$ connected to processor 30 by bus 44. Each trunk processor $21_i$ is connected to a respective memory $23_i$ by a respective bus $39_i$. The revised trunk distribution method is also stored in memory $23_i$ for every i from 0 to V-1.

Packet switch 12 has many sets of bi-directional ports, e.g., 36 and 38. The bi-directional ports 36 and 38 are connected to processors $21_0$ and $21_{V-1}$ by buses $40_0$ and $40_{V-1}$ respectively. For the embodiment of FIGS. 1 and 2, bi-directional port 36 is connected to trunk group 15, and bi-directional port 38 is connected to trunk group 16. Processor 30 provides virtual circuits for calls from trunk groups 15 or 17 traveling out across trunks of trunk group 16. The setting up of the virtual circuits by the processor 30 is essentially the same as that of the known method, except for the more efficient revised distribution method according to the invention.

Figure 3:
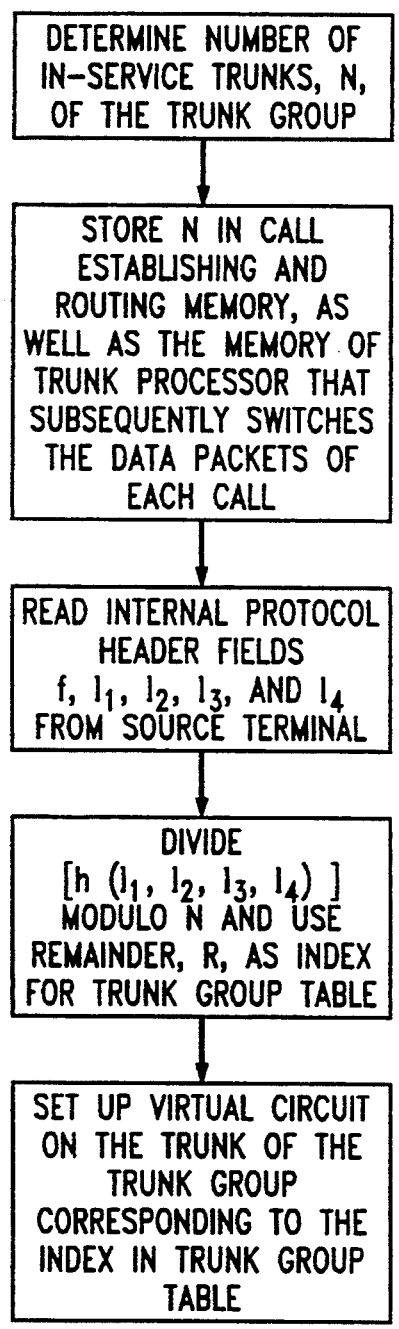
FIG. 3 is an illustration of the trunk distribution method according to the present invention.

Referring now to FIG. 3 and Table IV, the revised distribution method will be described. First, a variable $N_{TG}$ is defined as representing the number of trunks of a trunk group in-service at any period of time. The number of in-service trunks of the trunk group is then determined from configuration data maintained in the switch's memory 32 and assigned as the value of the variable $N_{TG}$. After the value of $N_{TG}$ has been determined, a trunk group table having a size equal to the value of $N_{TG}$, as illustrated by TABLE IV, is generated and stored in memory 32. This trunk group table is subsequently used by a processor 30 to distribute calls evenly and efficiently among the trunks of the trunk group. Processor 30 then establishes and sets up the calls. A copy of the trunk group table along with the value of $N_{TG}$ is also stored in memory $23_{V-1}$ of trunk processor $21_{V-1}$. A similar trunk group table of size $N_{TG}$ along with the value of $N_{TG}$ is subsequently stored in the corresponding memories of the switches 11 and 14 that switch data packets via switch 12.

Table IV is similar to Tables I and II above of the known distribution method, except that a trunk group table of size $N_{TG}$ containing the identifiers of the active trunks is set up in memory for each trunk group 15 and 16.

The value of $N_{TG}$ varies with the number of in-service trunks in the trunk group. Thus, the value of $N_{15}$, for trunk group 15, may be different from the value of $N_{16}$ for trunk group 16. But when switch 12 is put into the system 10, its processor 30 creates a table of size $N_{15}$ for trunk group 15 in memory 32. Processor 30 also creates a table of size $N_{16}$ for trunk group 16. The table for trunk group 15 has $N_{15}$ index numbers 0 to $N_{15}$-1 and the table for trunk group 16 has $N_{16}$ index numbers 0 to $N_{16}$-1. For each trunk group table index number a corresponding trunk identification number is assigned. There is a one-to-one correspondence which prevents the inefficiencies that occurred in TABLE III above. Moreover, if a trunk should fail, the failure is sensed by diagnostic programs and a new value of $N_{TG}$ for the trunk group that lost a trunk is determined and a new, smaller table created to reflect the smaller $N_{TG}$ value. This reforming of the trunk group table restores the one-to-one relationship between index numbers and trunks that are important to the trunk group efficiency.

A call coming to switch 12 from one of the units, for example, DTE $20_0$, has a logical channel identifier f that has been assigned to the call. DTE $20_0$ has access to unused logical channel identifiers and selects the highest one available. The selected logical channel identifier f is entered into a field of the header of the X.25 call setup packet and transmitted to the packet switch 11. This X.25 protocol header conforms to the 1988 CCITT recommendation for X.25 and follows the suggestion of Annex A of the recommendation that this logical channel identifier be allocated according to the highest unused/idle logical channel first. Thus, the sequence of logical channels f at any one time consists of a decreasing sequence of positive integers which differ by 1, starting with the highest logical channel number. This highest logical channel number, for example, is pre-selected by the designer. Upon receipt by the packet switch 11, this logical channel information is copied from the X.25 packet header into the internal protocol packet header. Packet switch 11 then uses the internal protocol to send this logical channel information to packet switches 12, and 14. As mentioned above, the internal protocol is used by the packet switches 12, 14 to communicate with each other.

The internal protocol header contains two sets of 4 identifiers (denoted here as $1_i$, i=1,2,3,4). The first set of identifiers uniquely identifies the physical port by which the source unit, e.g. packet switch 11 is connected to the packet switch 12. The second set of identifiers uniquely identifies the physical port by which the destination unit, e.g. packet switch 14 is connected to the packet switch 12. The individual number of the source and destination port identifiers are called: the packet switch unit group number, packet switch unit number, the circuit board number and port number, respectively. The packet switch group number ranges from 0 to 63, the packet switch unit number ranges from 0 to 15, the circuit board number ranges from 0 or 1, and the port number ranges from 0 to 3. These four numbers are also predetermined by the designer, and together with the logical channel number uniquely identifies each call on a given packet switch (for example 12).

TABLE IV

| | Trunk Group Size $N_{TG}$ | |
|---|---|---|
| Index | 0 | $1 \ldots N_{TG}$ |
| Trunk ID | 0 | $1 \ldots N_{TG}$ |

The revised method used by both the call processor and the data switching processor simply uses the remainder from the modulo $N_{TG}$ division of (h(1)+f) to index into the trunk group table and selects a trunk for the call. The h(1) function is a distribution or hashing function known to have uniform distribution proprieties such as: $h(1) = 16 l_1 + l_2 + 4 l_3 + l_4$.

After the indexing into the trunk group table has selected a trunk from the trunk group to carry the packet, the trunk group processor associated with the trunk group sets up a virtual circuit with the destination unit on the selected trunks.

Note that for a given trunk group, the switch on the source unit side of the group uses the source identifiers while the switch on the destination unit side uses the destination identifiers. This causes both packet switches to use exactly the same set of identifiers and ensures that both directions of a virtual circuit traverse the same trunk.

In Operation

Referring now to Table V, the known and revised trunk group call distribution methods are compared using both measurements on a lab prototype and computer simulation. Lab measurements were made on two interconnected switches, where each switch was configured with 8 DTEs. A total of 600 calls were set up, with no call clears. To account for networking and more general traffic effects, a simulation model was also employed. In the simulation, a network of 13 fully connected 1PSS switches was considered, where each switch terminated access lines from 50 DTEs. Each DTE was provisioned for a maximum of 2047 logical channels. The traffic model assumed that the calls were generated at the DTEs according to a Poisson process. The calls were chosen to have exponentially distributed holding times with average duration of 5 minutes. This resulted in calls that were uniformly distributed over the trunk groups of a switch. The average call setup rate per trunk was 6144 calls/hour, resulting in the average number of calls up being 512. Table V lists the average trunk group efficiencies for trunk groups having 2, 3, 4, 5, 6, 7 and 8 trunks for the known method and the revised method in accordance with the invention. The results shown in Table V were for a simulation of a 60 minute operating period.

| Trunks per Group | Trunk Group Efficiency | | | |
|---|---|---|---|---|
| | Simulation | | Lab Measurement | |
| | Known | Revised | Known | Revised |
| 2 | 99% | 99% | 100% | 100% |
| 3 | 89% | 99% | 88% | 100% |
| 4 | 99% | 99% | 100% | 100% |
| 5 | 79% | 98% | 77% | 100% |
| 6 | 66% | 96% | 64% | 99% |
| 7 | 58% | 95% | 55% | 98% |
| 8 | 98% | 96% | 96% | 98% |

Table V Trunk Group Utilization for various sizes

The results show the improvement to a high level of utilization of the revised method as compared with the known method. Furthermore the revised method provides additional advantages of significantly improving the distribution of calls across a trunk group, not requiring changes to the packet switch internal protocol header, and maintaining an even call distribution when trunks are added to or deleted from the set of active trunk of a group.

Thus, it will now be understood that there has been disclosed a method and apparatus for distributing packet traffic among the trunks connecting two packet switches. While the invention has been particularly illustrated and described with reference to preferred embodiments thereof, it will be understood by those skilled in the art that various changes in form, details, and applications may be made therein. For example, a method of distribution based on the number of trunks or lines in a group may be used with switches supporting any virtual circuit oriented protocol, such as Frame Relay, Cell Relay/BISDN and X.25, even though developed for the 1PSS and its internal protocol. It is accordingly intended that the appended claims shall cover all such changes in form, details and applications which do not depart from the true spirit and scope of the invention.

What is claimed as new and desired to be secured by Letters Patent of the United States is:

1. A method for distributing a plurality of calls among a group of trunks connecting two packet switches, where said group of trunks is either less than or more than eight in number, the method comprising the steps of:
   determining a number N of in-service trunks in the group of trunks;
   creating a trunk group table of size N in each of the packet switches connected by the group of trunks, said trunk group table having integer indices from the number 0 to N-1 and corresponding to each of said integer indices is a respective trunk ID from the number 0 to N-1;
   assigning an integer identification number to each call;
   dividing each integer identification number by N to obtain a quotient and a remainder;
   using said remainder as an index into said trunk group table to select a trunk of said group of trunks to carry each call; and
   setting up each call on the selected trunk.

2. A method for distributing a plurality of calls among a group of trunks connecting two packet switches, the method comprising the steps of:
   determining a number N of in-service trunks in the group of trunks;
   storing the number N in both of the packet switches connected by the group of trunks, said trunk group table having integer indices from the number 0 to N-1 and corresponding to each of said integer indices is a respective trunk ID from the number 0 to N-1;
   creating a trunk group table of size N in both of the packet switches connected by the group of trunks;
   assigning a logical channel number to each call;
   assigning a packet switch unit group number, a packet switch unit number, a board number and a port number to each call, and
   sorting calls between packet switches evenly among the trunks of the group of trunks according to the logical channel numbers, packet switch unit group numbers, packet switch unit numbers, board numbers and port numbers thereof.

3. The method as set forth in claim 2, further comprising the steps of:
   sorting calls by taking for each call a sum of said logical channel number, said packet switch unit number, sixteen times said packet switch unit group number, said board number and said port number;
   dividing each sum by N and obtaining a quotient and a remainder;
   using each remainder as an index to select a trunk from said trunk group table to communicate its respective call between the packet switches.

4. A method for distributing a plurality of calls among a group of trunks connecting multiple communication switches, the method comprising the steps of:
   a. determining a number N of in-service trunks in the group of trunks;
   b. storing the number N in each of the communication switches connected by the group of trunks;
   c. creating a trunk group table of size N in the switches connected by the group of trunks; said trunk group table having integer indices from the number 0 to N-1 and corresponding to each of said integer indices is a respective trunk ID from the number 0 to N-1;
   d. assigning a logical channel number to each call;
   e. assigning a switch unit group number, a switch unit number, a board number, and a port number to each call;
   f. sorting calls between communication switches evenly among the trunks of the group of trunks according to the logical channel numbers, switch unit group numbers, switch unit numbers, board numbers, and port numbers thereof;
   g. redetermining N after a change of the number of trunks in the group of trunks; and
   repeating steps a. through f.

5. Apparatus for distributing a plurality of calls among a group of trunks interconnecting multiple communication switches, the apparatus comprising:
   means for determining a number N of in-service trunks in the group of trunks;
   means for storing the number N in each of the communication switches connected by the group of trunks;
   means for creating a trunk group table of size N in the communication switches connected by the group of trunks;
   said trunk group table having integer indices from the number 0 to N-1 and corresponding to each of said integer indices is a respective trunk ID from the number 0 to N-1;
   means for assigning a logical channel number to each call;
   means for assigning a switch unit group number, a switch unit number, a board number, and a port number to each call; and
   means for sorting calls between communication switches evenly among the trunks of the group of trunks according to the logical channel numbers, switch unit group numbers, switch unit numbers, board numbers and port numbers thereof to obtain an even distribution of calls among all the trunks of the group of trunks.

6. The apparatus according to claim 5, further comprising;

means for redetermining N after a failure of one of the trunks in the group of trunks such that the trunk group table is reformed with the reduced number of in-service trunks.

7. The apparatus according to claim 5, further comprising;

means for redetermining N after an addition of one of the trunks in the group of trunks such that the trunk group table is reformed with an increased number of in-service trunks.

* * * * *